United States Patent
Tompkin

(10) Patent No.: US 6,177,750 B1
(45) Date of Patent: *Jan. 23, 2001

(54) ROTATING ASSEMBLY CONSTRUCTION FOR HIGH SPEED INDUCTION MOTOR

(75) Inventor: Edward J. Tompkin, Cuyahoga Falls, OH (US)

(73) Assignee: Reliance Electric Technologies, LLC, Thousand Oaks, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/116,135

(22) Filed: Jul. 14, 1998

(51) Int. Cl.$^7$ ...................................................... H02K 1/28
(52) U.S. Cl. ........................................... 310/261; 211/216
(58) Field of Search ................................... 310/261, 211, 310/212, 216, 262

(56) References Cited

U.S. PATENT DOCUMENTS

| | | | |
|---|---|---|---|
| 3,990,802 | * 11/1976 | Corona | 403/24 |
| 4,644,210 | 2/1987 | Meisner et al. | 310/211 |
| 4,808,932 | 2/1989 | Schulz, Jr. et al. | 324/545 |
| 4,970,424 | 11/1990 | Nakamura et al. | 310/211 |
| 5,363,004 | * 11/1994 | Futami et al. | 310/156 |
| 5,444,319 | 8/1995 | Nakamura et al. | 310/211 |
| 5,512,792 | * 4/1996 | Bawin et al. | 310/262 |
| 5,726,516 | * 3/1998 | Randall | 310/261 |

FOREIGN PATENT DOCUMENTS

| | | | |
|---|---|---|---|
| 0225440 | 6/1987 | (EP) | H02K/17/16 |
| 509119 | * 10/1992 | (EP) | H02K/1/28 |
| 0546197 | 6/1993 | (EP) | H02K/17/16 |
| 0618662 | 10/1994 | (EP) | H02K/17/16 |

* cited by examiner

Primary Examiner—Burton Mullins
(74) Attorney, Agent, or Firm—Himanshu S. Amin; John J. Horn; William R. Walbrun

(57) ABSTRACT

A shaft or shafts are connected to a rotor core of a dynamo-electric machine without the need for a central hole in the laminations of the core. The shaft is connected to the core by attaching the shaft to a rotor end plate (or forming the shaft and the end plate as a single unit) and connecting the end plate to the core at a distance away from the axis of the core. The rotor may have similar end plates at both ends, the end plates attached to each other and to the core by through studs or bolts that pass through holes in the laminations. The holes and the studs or bolts are evenly circumferentially spaced at a distance from the axis. The through studs or bolts are secured at either end, clamping the end plates with the rotor core between them. The rotor end plate provides support to the rotor end ring that forms part of the squirrel cage of the rotor core. The end plate includes a lip or other portion which restrains movement of the end ring in lateral and/or axial direction(s) as the rotor rotates. For example, the rotor may have a lip which is machined to be at or nearly in contact with the end ring when the rotor is at rest.

17 Claims, 4 Drawing Sheets

ROTATING ASSEMBLY CONSTRUCTION FOR HIGH SPEED INDUCTION MOTOR

TECHNICAL FIELD

The invention generally relates to dynamoelectric machines with rotors having attached shafts. In particular, the invention involves attachment of a shaft to a rotor core while maintaining intact a solid central portion of laminations in the rotor core.

BACKGROUND OF THE INVENTION

Typical induction motor designs have a rotor including a plurality of laminated sheets (laminations) and a shaft attached to the rotor. Interaction between magnetic fields created by the rotor and a stator surrounding the rotor causes torque to be created in the rotor. This torque rotates the rotor, thereby also rotating the attached shaft. Therefore it is desirable that the connection between the shaft and the rotor be sufficiently strong to allow transmission of the torque from the rotor to the shaft. An additional requirement in attaching the shaft to the rotor core is that the rotor should be strong enough, both torsionally and laterally, to withstand any load, such as a belt load, to which it will be subjected. Further, the rotor should be strong enough so that parts of it do not crack, break, or otherwise fail while it is spinning, particularly at higher speeds.

Conventionally, shafts have been attached to rotor cores through a central hole in the laminations making up the rotor core. The shaft is attached to the rotor core by means such as heat shrinking, welding, and/or a key on the shaft that fits into a slot in the laminations, thereby allowing the core to transmit torque to the shaft.

The conventional method of attaching the shaft to the core through a central hole has the drawback of inducing a stress concentration in the laminations. It is well known that the presence of even a very small hole at the axis of a rotating disc will cause the stress of the material bounding the hole to double when compared with the stress at the center of a solid disk. See, e.g., Adel S. Saada, *Elasticity: Theory and Applications*, p. 337 (1983). Thus the central hole in the laminations leads to high tangential stresses in the lamination material in the vicinity of the hole. These high stresses can lead to failure of the rotor, due to radial cracks in the laminations.

In view of the above, it would be desirable to attach a shaft to a rotor core of a dynamoelectric machine without disturbing the lamination material in the vicinity of the axis of the rotor.

SUMMARY OF THE INVENTION

According to one aspect of the invention, a shaft or shafts are connected to a rotor core without the need for a central hole in the laminations of the core. The shaft is connected to the core by attaching the shaft to a rotor end plate (or forming the shaft and the end plate as a single unit) and connecting the end plate to the core at a distance away from the axis of the core. The rotor may have similar end plates at both ends, the end plates attached to each other and to the core by through studs or bolts that pass through holes in the laminations. The holes and the studs or bolts are evenly circumferentially spaced at a distance from the axis. The through studs or bolts are secured at either end, clamping the end plates with the rotor core between them.

According to another aspect of the invention, the rotor end plate provides support to the rotor end ring that forms part of the squirrel cage of the rotor core. The end plate includes a lip or other portion which restrains movement of the end ring in lateral and/or axial direction(s) as the rotor rotates. For example, the rotor may have a lip which is machined to be at or nearly in contact with the end ring when the rotor is at rest.

According to yet another aspect of the invention, a dynamoelectric machine includes a rotor having a core and an axis of rotation, the core including a plurality of laminations; a rotor end plate coupled to a first end of the rotor core; and a rotor shaft coupled to the rotor end plate. The rotor shaft rotates about the axis of rotation of the rotor, and at least a portion of the plurality of laminations intersect the axis of rotation.

According to a further aspect of the invention, a dynamoelectric machine includes a rotor having a rotor core including a plurality of laminations, wherein at least one of the plurality of laminations has a solid central portion that is coincident with an axis of rotation of the rotor.

According to a still further aspect of the invention, an induction motor includes a rotor having a core and an axis of rotation, the core including a plurality of laminations; a rotor end plate coupled to a first end of the rotor; and a rotor shaft coupled to the rotor end plate and projecting in one direction from the end plate away from the rotor, the rotor shaft rotating about the axis of rotation of the rotor.

Yet according to another aspect of the present invention a method of fabricating a dynamoelectric machine includes the steps of: using lamination sheets as at least part of a core of a rotor, at least one of the lamination sheets having a solid central portion; and using an end plate to couple a shaft to the rotor.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principals of the invention may be employed. Other objects, advantages and novel features of the invention will become apparent from the following detailed description of the invention when considered in conjunction with the drawings.

DETAILED DESCRIPTION OF THE INVENTION

The present invention relates to a dynamoelectric machine including a rotor have a core comprising lamination sheets. A rotor shaft of the machine is coupled to the rotor via an end plate. As a result, the rotor shaft does not pass through the center of all the lamination sheets. Accordingly, the machine includes lamination sheets which have a solid central portion and thus experience less stress than lamination sheets having a hole at the axis of rotation of the lamination sheet. A detailed description of the present invention is provided below.

Figure 1:
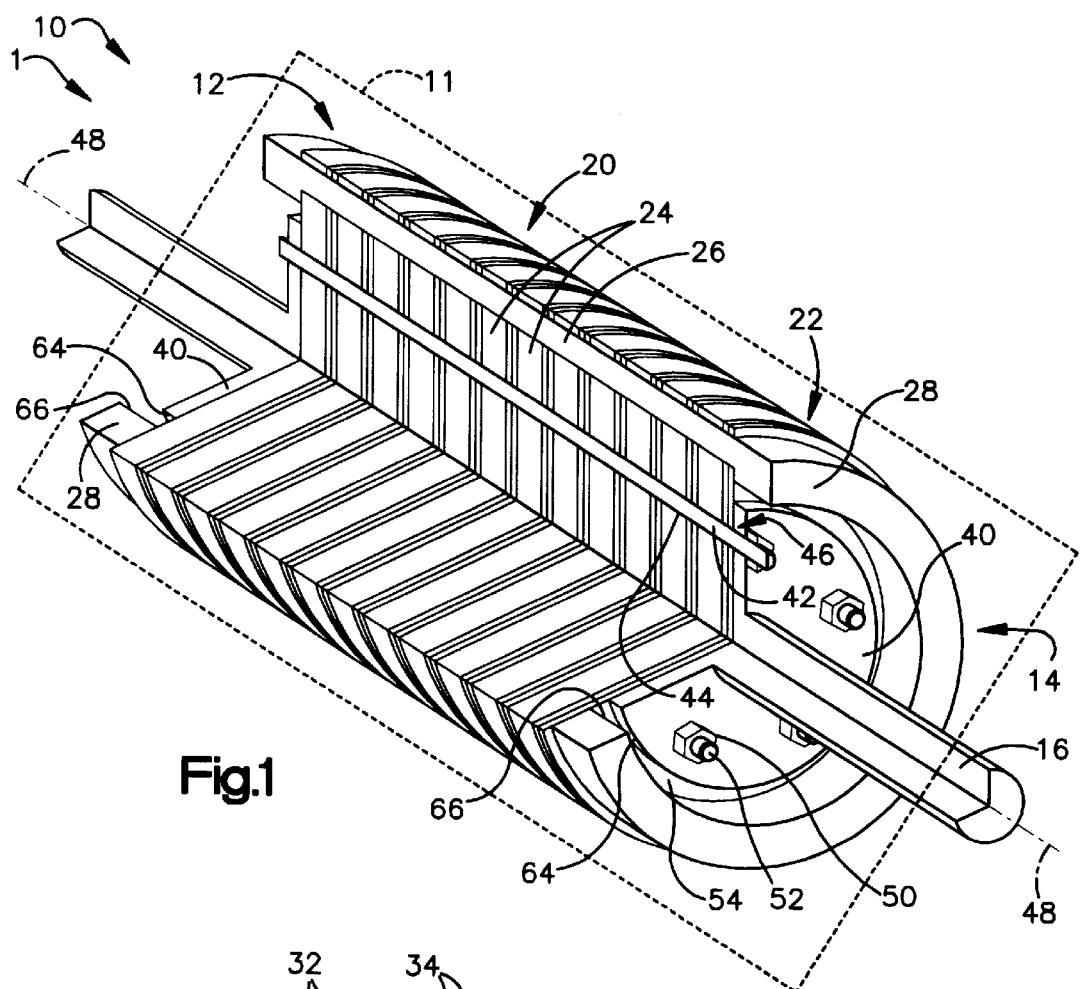
FIG. 1 is an isometric view, partly in section, of a rotor of a dynamoelectric machine in accordance with the present invention.
Figure 2:
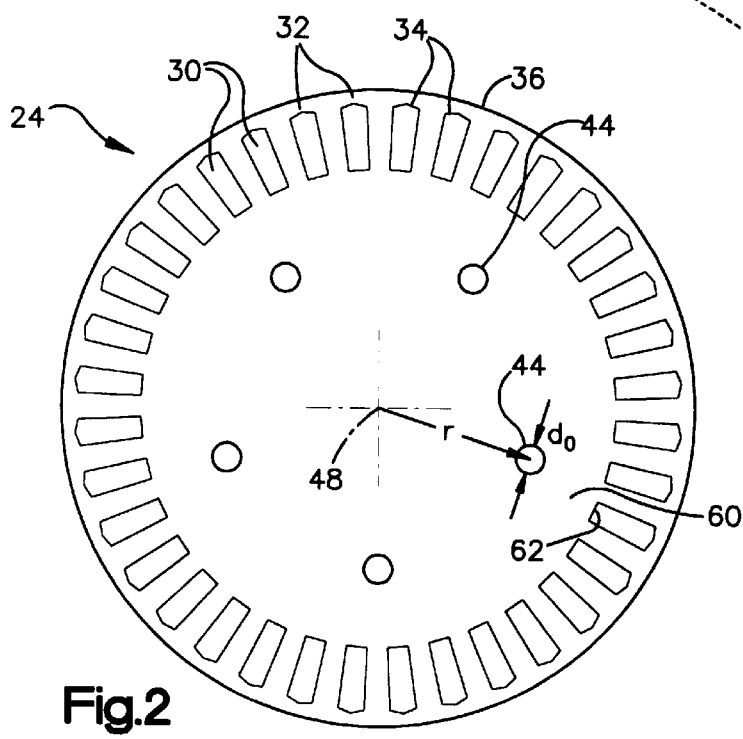
FIG. 2 is a plan view of a lamination of the rotor of FIG. 1 in accordance with the present invention.

Referring now in detail to the drawings wherein like reference numerals designate like parts in the several figures, and initially to FIGS. 1 and 2, a dynamoelectric machine 1 (e.g., a motor, generator), has a rotor 10 which is located concentrically within a stator schematically represented at 11 by dash lines. The rotor 10 includes a rotor core 12 and shaft assemblies 14 attached to the rotor core 12. The rotor 10 generates rotational motion in response to a magnetic field induced by the stator 11. The rotation induced in the rotor core 12 is transmitted to the shaft assemblies 14, and in particular to shafts 16. One or both of the shafts 16 may be used to provide rotational driving effort to equipment or other loads (not shown) which are connected to the shaft(s) 16 either directly or by means of belts, gears, or the like. In addition, one or both of the shafts 16 may be connected to a velocity feedback device or a position feedback device (not shown) in order to measure and/or to control rotation of the rotor 10.

The rotor core 12 includes a lamination stack 20 and a squirrel cage 22. The lamination stack 20 is composed of a stack of laminations 24 (show arrow heads otherwise limited to where you point). The laminations 24 are made of a ferromagnetic material such as electrical steel, iron, cobalt, nickel, or an alloy thereof. The laminations 24 may be different, although they are typically substantially identical to one another. The function of the lamination stack 20 is to amplify the magnetic field which is created by the current induced in the squirrel cage 22 by the magnetic field of the stator.

The squirrel cage 22 includes a plurality of rotor bars 26 typically evenly-spaced about the periphery of the rotor core 12, and end rings 28 attached to each of the rotor bars 26. The rotor bars 26 pass through slots 30 (FIG. 2) in the laminations 24, the slots 30 being located in each of the laminations 24 such that thin bridges 32 of material, strong enough to retain the rotor bars 26, remain between outer surface 34 and perimeter surface 36 of the lamination 24. The rotor bars 26 and the end rings 28 are made of an electrically conducting material, for example aluminum, copper, brass, or bronze. The rotor bars 26 and the end rings 28 may be formed by casting. This is done by stacking the laminations 24 to form the lamination stack 20, and then introducing melted conducting material into the slots 30 to form the rotor bars 26, and into an area adjacent the lamination stack 20 to form the end rings 28. Alternatively, the squirrel cage 22 may be formed by driving rotor bars which have been cast or machined through the slots 30 in the lamination stack 20, and then brazing or welding the ends of the rotor bars to end rings which have been cast or machined.

The end rings 28 serve to connect electrically the rotor bars 26 to one another, allowing a free flow of induced current. In addition, the squirrel cage 22 provides stiffness to the rotor core 12 and holds it together.

Besides the shaft 16, each of the shaft assemblies 14 includes an end plate 40 for attaching the shaft assemblies 14 to the rotor core 12. The end plate 40 is made of a nonconducting material, such as stainless steel or titanium. The shaft 16 and the end plate 40 may be made of the same material, and may be formed as a single unit. Alternatively, the shaft 16 may be joined to the end plate 40 by welding or brazing.

The shaft assemblies 14 are connected to each other and to the rotor core 12 by means of connecting members such as through studs or bolts 42. The through studs 42 pass through holes 44 in the laminations 24, and holes 46 in the end plates 40. By locating the holes 44 away from the axis 48 the stress concentration that results from having a shaft running through the axis of the rotor is avoided. The connecting members may be studs, bolts, pins, screws, rivets, or other fasteners. The holes 44 in the laminations 24 may be formed, for example, by stamping, drilling, or machining.

Nuts 50 on threaded ends 52 of the studs 42 are used to secure the through studs 42 to the end plates 40, pressing the end plates 40 against end faces 54 of the lamination stack 20. Thus the shaft assemblies 14 are coupled to the rotor core 12 while still allowing the laminations 24 to intersect the axis 48 of the rotor 10.

The through studs or bolts 42 connecting the end plates 40 to the rotor core 12 with the lamination stack 20 therebetween also serve to hold the rotor core 12 together.

While the rotor 10 has been described above and is shown in FIG. 1 as having two shafts 16, it will be appreciated that the rotor 10 alternatively may utilize only a single shaft, with such a rotor having an end plate on one end that is not connected to a shaft. If only one shaft is employed in the rotor, the end plate on the opposing end of the rotor may be replaced by an end ring (such as a modified end ring 28) of sufficient width to support nuts, heads of a bolt or through stud, etc.

The through studs 42 must be sufficiently strong to enable the torque induced in the rotor core 12 to be transmitted to the shaft assemblies 14 as the rotor 10 is rotated about the axis 48. When designing a rotor 10 of the present invention as a substitute for a rotor having a shaft running through the axis of the rotor core, it is desirable to have the same moment of inertia about the axis 48 of the rotor 10, in order to assure that the through studs 42 are sufficiently strong to transmit the torque from the rotor core 12 to the shaft assemblies 14. Matching the moments of inertia of a prior centrally-located shaft of diameter d with the moment of inertia of n through studs 42 with a diameter $d_0$ at a radius r from the axis 48 of the rotor 10, leads to the following relationship:

$$d^4 = nd_0^4 + 16nr^2 d_0^2$$

Figure 3:
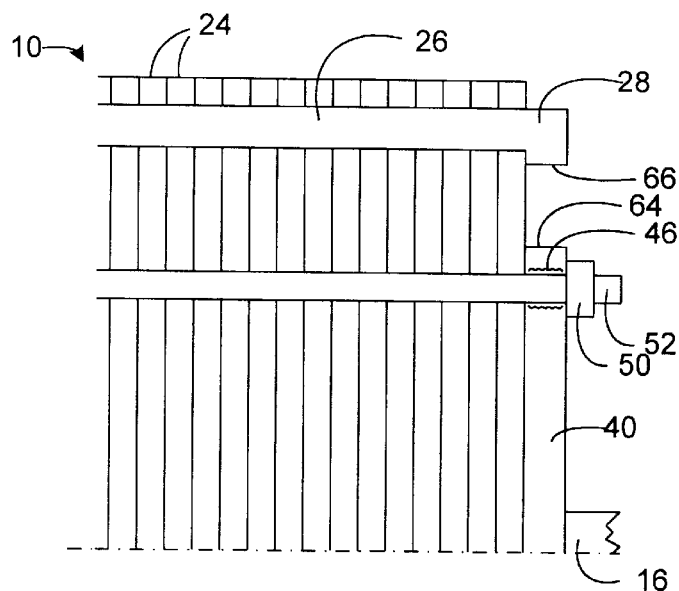
FIG. 3 is a sectional view of a portion of the rotor of FIG. 1 in the vicinity of an end ring in accordance with the present invention.

From this relation, it can be seen that for the purpose of effectively transmitting torque, it is desirable that the radius r be large. However, two constraints limit how large the radius r can be. First of all, the holes 44 in the laminations 20 must be located such that material 60 between the holes 44 and inner surfaces 62 of the slots 30 is of sufficient thickness to prevent stress concentrations that might lead to cracking or other mechanical failure of the laminations 24 in that area. The distance between the holes 44 and the inner surfaces 62 may, in an exemplary embodiment, be limited to be no less than 0.25 inches. Secondly, referring to FIG. 3, the holes 46 in the end plate 40 should be located such that outer surface 64 of the end plate 40 is radially inboard of inside surface 66 of the end ring 28.

Figure 5:
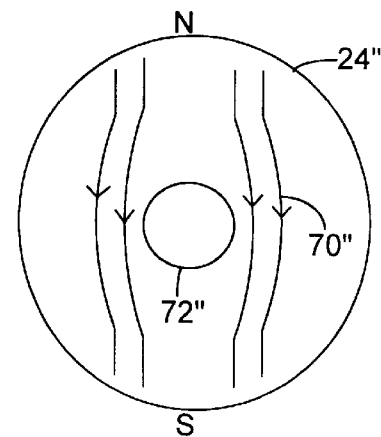
FIG. 5 is a plan view of a lamination of a prior art rotor as used in a two-phase motor, showing lines of magnetic flux.
Figure 4:
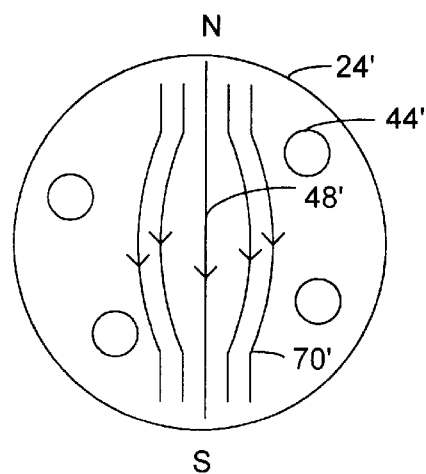
FIG. 4 is a plan view of a lamination for a rotor of the present invention as used in a two-phase motor, showing lines of magnetic flux.

Referring to FIGS. 4 and 5, an additional advantage of the present invention is that it improves efficiency of transmission of magnetic flux for rotors used in two-pole motors compared to rotors having a lamination stack with a central hole. Referring to FIG. 4, a lamination 24' of a rotor of the present invention is shown operating as part of a two-pole motor. Magnetic flux lines 70' (arrowhead in drawing) are able to go directly from north pole N to south pole S. Multiple holes 44' in the lamination 24', which are offset from the center 48', have only a minor impact on the flow of magnetic flux.

In contrast, referring to FIG. 5, magnetic flux lines 70" (arrowhead in drawing) of a prior art lamination 24" having a central hole 72" must bend around the central hole 72" as the flux 70" travels from north pole N to south pole S. This reduces efficiency for a two-pole motor. The increased efficiency of the present design may enable a reduction in rotor size for rotors used as part of two-phase motors.

Further, the present invention results in less waste of lamination material. Lamination material removed when hole(s) is/are stamped from the laminations is typically discarded as scrap. Since less material is removed in the sum of the areas of the multiple lamination holes for the present invention, than for the area of the single central hole in the laminations of prior art rotors, less material is wasted as scrap.

It will be appreciated that many variations on the above-described rotor design are possible. For example, while the rotor 12 as described above utilizes five through studs or bolts 42, a greater or lesser number of bolts or studs may be employed. While the through studs 42 are shown as connected to each of the end plates 40 by means of the nuts 50, other means of attaching or connecting through studs to end plates are possible. For example, through studs may be attached to end plates by welding, brazing, soldering, riveting, or other such means. Alternatively, through studs may be formed as an integral part of one of the end plates, thus reducing the number of parts needed in assembling the rotor 10.

While the holes 44 and the through studs 42 are described above as having circular cross section, it will be appreciated that other cross-sectional shapes, such as polygonal, especially rectangular, are possible with appropriate modifications. While the holes 44 and the through studs 42 are shown as evenly circumferentially spaced, an asymmetric distribution may be possible, with masses possibly added at points on the end plate or elsewhere to maintain balance of the rotor 10.

Figure 6:
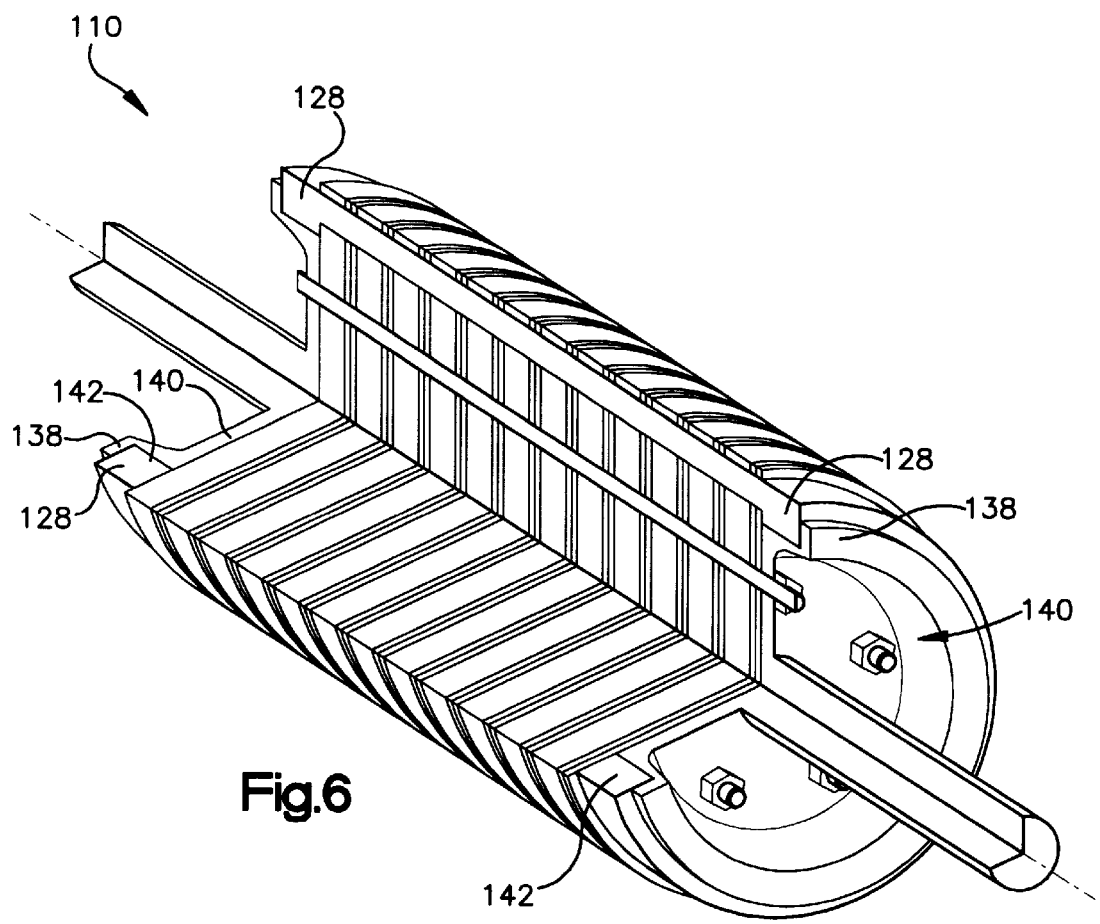
FIG. 6 is an isometric view, partly in section, of a rotor including a portion on the end plate that restrains motion of the end ring in accordance with another aspect of the present invention.
Figure 7:
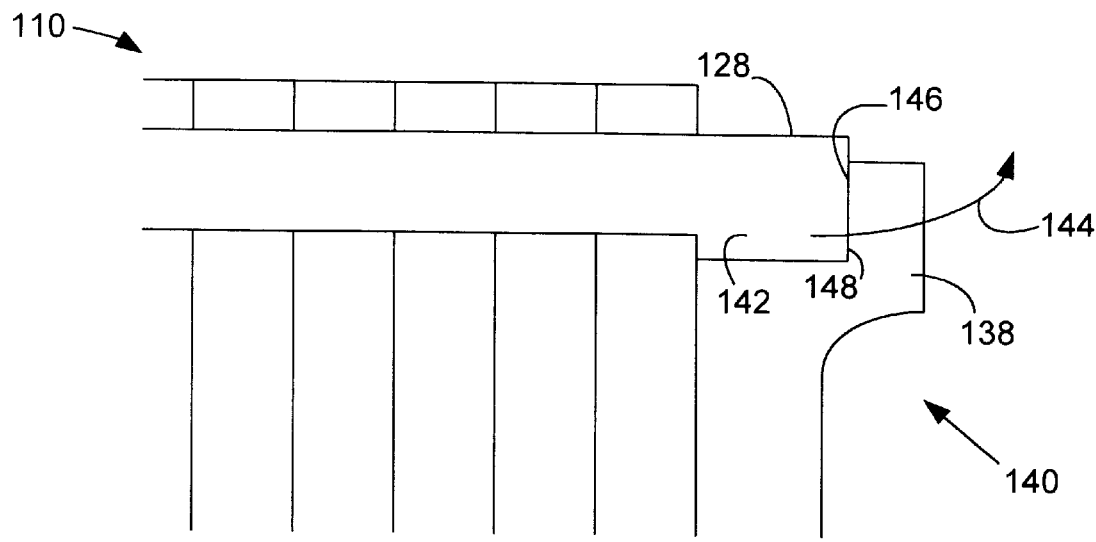
FIG. 7 is a fragmentary schematic sectional view of the rotor of FIG. 6 in the vicinity of the end ring in accordance with the present invention.

FIGS. 6 and 7 show an alternative embodiment of the invention. A rotor 110 similar to the rotor 10 described above, except as indicated below has end rings 128, each of which is secured in place with the aid of a restraining portion, such as a lip 138 on an end plate 140. As the rotor 110 rotates, centrifugal forces press the end ring 128 outward. This causes a radially inner portion 142 of the end ring 128 to flare outward in direction 144. The lip 138 restrains the tendency of the inner portion 142 to flare out, with an inner face 146 of the lip 138 pressing against an end surface 148 of the portion 142 as the portion 142 moves in the direction 144. Thus the end ring 128 is restrained from moving laterally and thereby flaring outward. Radial movement of the end ring 128 poses less of a threat to failure than flaring.

The lip 138 may be formed on the end plate 140 by machining, for example, removing material so that end plate 140 mates with the end ring 128. It will be appreciated that other methods could be used to form the lip 138 on the end plate 140, such as casting or welding.

It is not necessary for there to be a tight fit between the lip 138 and the end surface 148 in order for the lip 138 to restrain the tendency of the end ring 128 to flare out. Restraining the end ring 128 from gross motion may be sufficient to avoid cracking or other failure of the end ring 128.

Once contact is made between the end surface 148 and the inner face 146, the lip 138 will restrain further motion of the inner portion 142, because the end ring 128 is made of a relatively soft material, such as aluminum, when compared with the relatively stiff steel that the lip may be made of.

It will be appreciated that motion of the end ring may be further restrained by attaching the lip to the end ring, such as by welding, braising, soldering, or by means of fasteners such as screws, bolts, or rivets. It will also be appreciated that the lip need not extend along the full circumference of the end plate in order to restrain motion of the end ring; for example, arcuate portions of the lip may be removed, in order to save weight, materials, or for other reasons. Alternatively, the end ring may be restrained by another type of restraining portion, such as clips (not shown) attached to the end plate.

It may be possible to dispense with the need for through studs altogether, with the end plate coupled to the rotor core by attaching it directly to the end ring.

Figure 8:
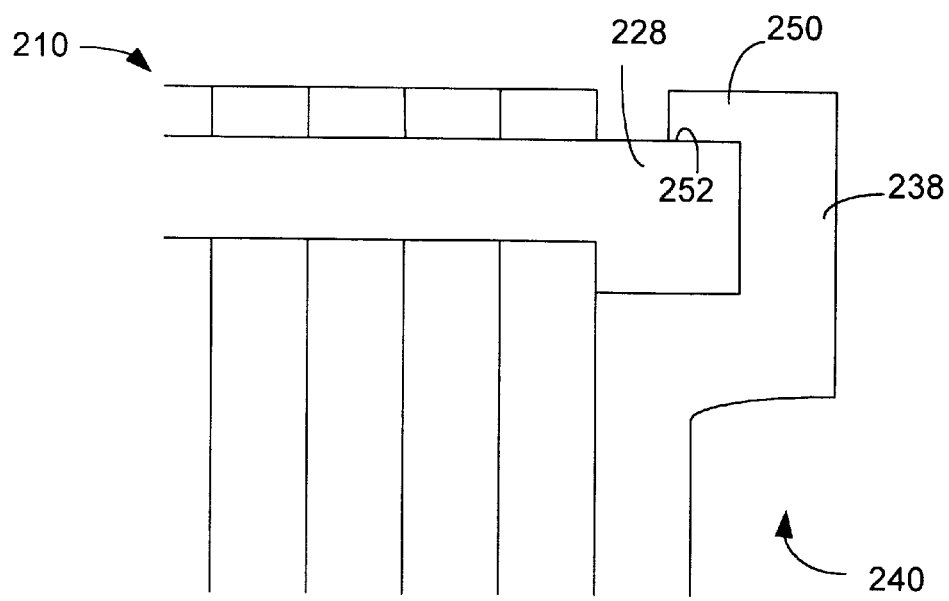
FIG. 8 is a fragmentary schematic sectional view of a rotor according to another embodiment of the invention in the vicinity of an end ring in accordance with another aspect of the present invention wherein the end plate has a portion which restrains motion of the end ring both laterally and radially.

FIG. 8 illustrates another alternative embodiment of the invention, a rotor 210 having an end ring 228 which is cradled by a lip 238 of an end plate 240. The lip 238 differs from the lip 138 in that it additionally includes an outer portion 250 which restrains radially outward movement of the end ring 228. The outer portion 250 does this by contacting an outside face 252 of the end ring 228. Therefore, the lip 238 constrains the end ring 228 from both lateral and radial movements.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such equivalents, alterations, modifications and variations that fall within the spirit and scope of the appended claims.

What is claimed is:

1. A dynamoelectric machine including a rotor, comprising:
 a rotor core including a plurality of laminations; and
 a first rotor end plate and a first end of a rotor shaft integrally formed as a single unit and a second rotor end plate and a second end of a rotor shaft integrally formed as a single unit, the first and second rotor end plates being coupled to respective ends of the rotor core by connecting members passing through holes in the laminations, the connecting members being uniformly distributed at a distance from the axis of rotation, the rotor core including a squirrel cage with rotor bars in slots in the laminations and two integrally formed end rings at respective ends of the rotor bars, the end rings substantially surrounding the respective end plates, each of the end plates including a lip contacting the respective end ring and restraining motion of the respective end ring due to centrifugal forces, the rotor shaft rotating about an axis of rotation of the rotor;

wherein at least a portion of the plurality of laminations intersect the axis of rotation.

2. The machine of claim 1 wherein the connecting members are studs or bolts.

3. The machine of claim 1 wherein the connecting members are radially inward of the end rings.

4. The machine of claim 3 wherein the connecting members are radially inward of the slots.

5. The machine of claim 4 wherein the connecting members are closer to the slots than to the axis of rotation.

6. The machine of claim 1 the first and second end plates having outside peripheral surfaces that are radially inboard to an inside peripheral surface of the respective end ring.

7. The machine of claim 1 wherein the lip contacts an end face of the end ring to restrain axial motion of the end ring.

8. The machine of claim 7 wherein the lip also contacts an outside face of the end ring to restrain radial motion of the end ring due to centrifugal forces.

9. A dynamoelectric machine comprising:

a rotor having a rotor core including a plurality of laminations, wherein at least one of the plurality of laminations has a solid central portion that is coincident with an axis of rotation of the rotor; and a first rotor end plate and a first end of a rotor shaft integrally formed as a single unit and a second rotor end plate and a second end of a rotor shaft integrally formed as a single unit, the first rotor end plate coupled to a first end of the rotor core and the second rotor end plate coupled to a second end of the rotor core, the first and second rotor end plates being coupled to respective ends of the rotor core by connecting members passing through holes in the laminations, the connecting members being uniformly distributed at a distance from the axis of rotation, the rotor core including a squirrel cage with rotor bars in slots in the laminations and two integrally formed end rings at respective ends of the rotor bars, the end rings substantially surrounding the respective end plates, each of the end plates including a lip contacting the respective end ring and restraining motion of the respective end ring due to centrifugal forces, the rotor shaft rotating about an axis of rotation of the rotor.

10. The machine of claim 9, further comprising a stator magnetically coupled to the core.

11. An induction motor, comprising:

a rotor having a core and an axis of rotation, the core including a plurality of laminations; and a first rotor end plate and a first end of a rotor shaft integrally formed as a single unit and a second rotor end plate and a second end of a rotor shaft integrally formed as a single unit, the first rotor end plate coupled to a first end of the rotor core and the second rotor end plate coupled to a second end of the rotor core, the first and second rotor end plates being coupled to respective ends of the rotor core by connecting members passing through holes in the laminations, the connecting members being uniformly distributed at a distance from the axis of rotation, the rotor core including a squirrel cage with rotor bars in slots in the laminations and two integrally formed end rings at respective ends of the rotor bars, the end rings substantially surrounding the respective end plates, each of the end plates including a lip contacting the respective end ring and restraining motion of the respective end ring due to centrifugal forces, the rotor shaft rotating about an axis of rotation of the rotor.

12. The motor of claim 11 wherein at least a portion of the plurality of laminations intersect the axis.

13. A dynamoelectric machine, comprising:

a core and an axis of rotation, the core including a plurality of laminations and a squirrel cage including rotor bars and integrally formed end rings attached to both ends of the rotor bars;

a first rotor end plate and a first end of a rotor shaft integrally formed as a single unit and a second rotor end plate and a second end of the rotor shaft integrally formed as a single unit, the end rings substantially surrounding the respective first and second end plates, the rotor shaft rotating about the axis of rotation of the rotor;

a lip integrally formed on both of the first and second end plates, the lip restraining motion of the respective end ring due to centrifugal forces;

wherein at least a portion of the plurality of laminations intersect the axis of rotation.

14. The machine of claim 13 wherein the lip for restraining includes an outer portion for restraining motion of the end ring in a radial direction.

15. A method of fabricating a dynamoelectric machine including the steps of:

using lamination sheets as at least part of a core of a rotor, at least one of the lamination sheets having a solid central portion; and using a first end plate and a first end of a shaft formed as a single unit and a second end plate and a second end of a shaft formed as a single unit to couple the shaft to the rotor, the rotor core including a squirrel cage with rotor bars in slots in the laminations and two integrally formed end rings at respective ends of the rotor bars, the end rings substantially surrounding the respective end plates, and the end plates including a lip contacting the respective end ring and restraining motion of the respective end ring due to centrifugal forces.

16. A system for driving a load, comprising:

a dynamoelectric machine including a rotor having a core comprising a plurality of laminations, at least a portion of the laminations intersecting an axis of rotation of the rotor; and a rotor shaft having a first end operatively coupled to the load, and a second end coupled to the core via an end plate, the end plate and the rotor shaft being formed as a single unit, a squirrel cage with rotor bars in slots in the laminations and an integrally formed end ring on ends of the rotor bars, the end ring substantially surrounding the end plate, including a lip contacting the end ring and restraining motion of the end ring due to centrifugal forces.

17. The system of claim 16 wherein the dynamoelectric machine also includes a stator magnetically coupled to the core.

* * * * *